United States Patent [19]

Hemingway

[11] Patent Number: 5,777,323
[45] Date of Patent: Jul. 7, 1998

[54] METHOD FOR LOGGING AN EARTH FORMATION USING RECYCLED ALPHA DATA

[75] Inventor: James L. Hemingway, Bakersfield, Calif.

[73] Assignee: Schlumberger Technology Corporation, Houston, Tex.

[21] Appl. No.: 853,816

[22] Filed: May 9, 1997

Related U.S. Application Data

[60] Provisional application No. 60/017,528 May 10, 1996.
[51] Int. Cl.$^6$ .................................................. G01V 5/10
[52] U.S. Cl. .............................. 250/269.6; 250/262
[58] Field of Search ................................ 250/262, 264, 250/265, 269.6, 269.7, 269.3

[56] References Cited

U.S. PATENT DOCUMENTS

| | | | |
|---|---|---|---|
| 3,282,095 | 11/1966 | Owens | 250/269.6 X |
| 3,886,355 | 5/1975 | Culver | 250/269.6 X |
| 3,993,902 | 11/1976 | Neuman | 250/269.6 X |
| 4,492,864 | 1/1985 | Smith, Jr. et al. | 250/269.6 X |
| 4,786,796 | 11/1988 | Flaum et al. | |
| 4,794,792 | 1/1989 | Flaum et al. | |
| 4,909,075 | 3/1990 | Flaum et al. | |
| 4,937,446 | 6/1990 | Mckeon et al. | |
| 5,045,693 | 9/1991 | Mckeon et al. | |
| 5,055,676 | 10/1991 | Roscoe et al. | |

*Primary Examiner*—Edward J. Glick
*Attorney, Agent, or Firm*—Brigitte L. Jeffery; John J. Ryberq

[57] ABSTRACT

A method for determining a characteristic of an earth formation traversed by a borehole precisely monitors the hydrocarbon saturation change during production of an oil field. For an initial logging pass, inelastic gamma ray spectra are detected in response to neutrons irradiating the formation and materials in the borehole. An energy window is selected to provide a carbon/oxygen ratio (COW) for determining a volume of oil. A carbon/oxygen ratio is also extracted from the inelastic energy spectra (COR) for determining a volume of oil. The linear correlation between the COW determined volume of oil and the COR determined volume of oil is used to derive a baseline $\alpha$. For a subsequent logging pass, inelastic gamma ray spectra are detected and an energy window is selected to provide a subsequent carbon/oxygen ratio (COW') for determining a subsequent volume of oil. Baseline $\alpha$ is added to the subsequent volume of oil to improve the precision of the measurement.

13 Claims, 4 Drawing Sheets

5,777,323

METHOD FOR LOGGING AN EARTH FORMATION USING RECYCLED ALPHA DATA

Cross-References

This present application claims the benefit of U.S. Provisional Application No. No. 60/017528 filed May 10, 1996 (attorney docket No. 20.2646).

BACKGROUND OF THE INVENTION

A major goal of well logging is to maximize the amount of hydrocarbons recovered from an earth formation. By continuously monitoring oil saturation ($S_o$) in the earth formation, secondary and tertiary techniques may be employed to enhance recovery of hydrocarbons. Three methods have been developed for monitoring oil saturation during production of a well. One method, electrical resistivity, measures the water saturation, $S_w$, and uses the difference, $1-S_w$, to derive oil saturation, $S_o$. This method depends upon the presence of salts dissolved in the water and is less effective in fresh water than in salt water environments.

The second method involves drilling and coring a new well and analyzing the core to obtain oil saturation. This method is expensive and may not accurately reflect changes in oil saturation because the core samples represent different areas of the formation.

The third method is based on the fact that hydrocarbons contain carbon and water contains oxygen. A carbon/oxygen ratio (COR) is used to compute oil saturation. The COR is derived by applying a spectral fitting technique to an inelastic gamma ray spectrum to compute carbon, oxygen, and other elements present in the formation. This approach provides an accurate means for computing the COR, however, due to the large amount of data required to obtain a precise $S_o$ measurement, the statistical precision is worse and results in a substantially decreased logging speed. Alternatively, the COR is derived using counts from broad energy windows in the inelastic gamma ray spectrum across the region of the predominant carbon and oxygen gamma ray energies. These broad windows contain a large number of counts allowing for faster logging speeds, however, the window counts are strongly influenced by other formation elements, the casing and the tubing configuration in the borehole, thereby, resulting in a less accurate oil saturation computation.

The Reservoir Saturation Tool (RST), a mark of Schlumberger, uses a method known as "alpha processing" to combine the accuracy of spectral fitting with the precision of windows processing (see U.S. Pat. Nos. 4,794,792, 4,768, 796, and 4,909,075 issued to Flaum et al., assigned to Schlumberger Technology Corporation) to determine the oil saturation in a formation. While this technique provides a precise computation of the oil saturation, each logging run which utilizes alpha processing greatly increases the logging time needed to obtain the accuracy of spectral fitting. When relogging and calculating the COR for a well over a period of months, particularly in a field under water flood, steam flood, or any other secondary or tertiary recovery system, the RST does not precisely detect changes in oil saturation. An efficient use of these recovery systems will translate into a substantial savings in the cost for producing a well.

For the foregoing reasons, there is a need for a method which precisely determines the oil saturation of a formation producing hydrocarbons over a period of time.

SUMMARY OF THE INVENTION

The above disadvantages of the prior art are overcome by a method and apparatus for determining a characteristic of an earth formation traversed by a borehole. A logging tool having a neutron source and at least one detector longitudinally spaced from the source. The logging tool is lowered into the borehole and the source irradiates the formation using sufficient energy to interact with atoms of the formation and the borehole. At least one detector detects the gamma rays resulting from the interaction of neutrons with atoms of the formation and borehole. An inelastic energy spectrum is formed and used to derive a first attribute of the formation. Also, count rate signals are generated based on the detected gamma rays and used to derive a second attribute of the formation. A value for the linear correlation between the first attribute and second attribute is determined. After irradiating the formation on a subsequent logging pass, count rate signals are generated based on the detected gamma rays and used to derive a subsequet attribute of the formation. The linear correlation value is combined with the subsequent attribute of the formation to derive a formation characteristic.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENT

Figure 1:
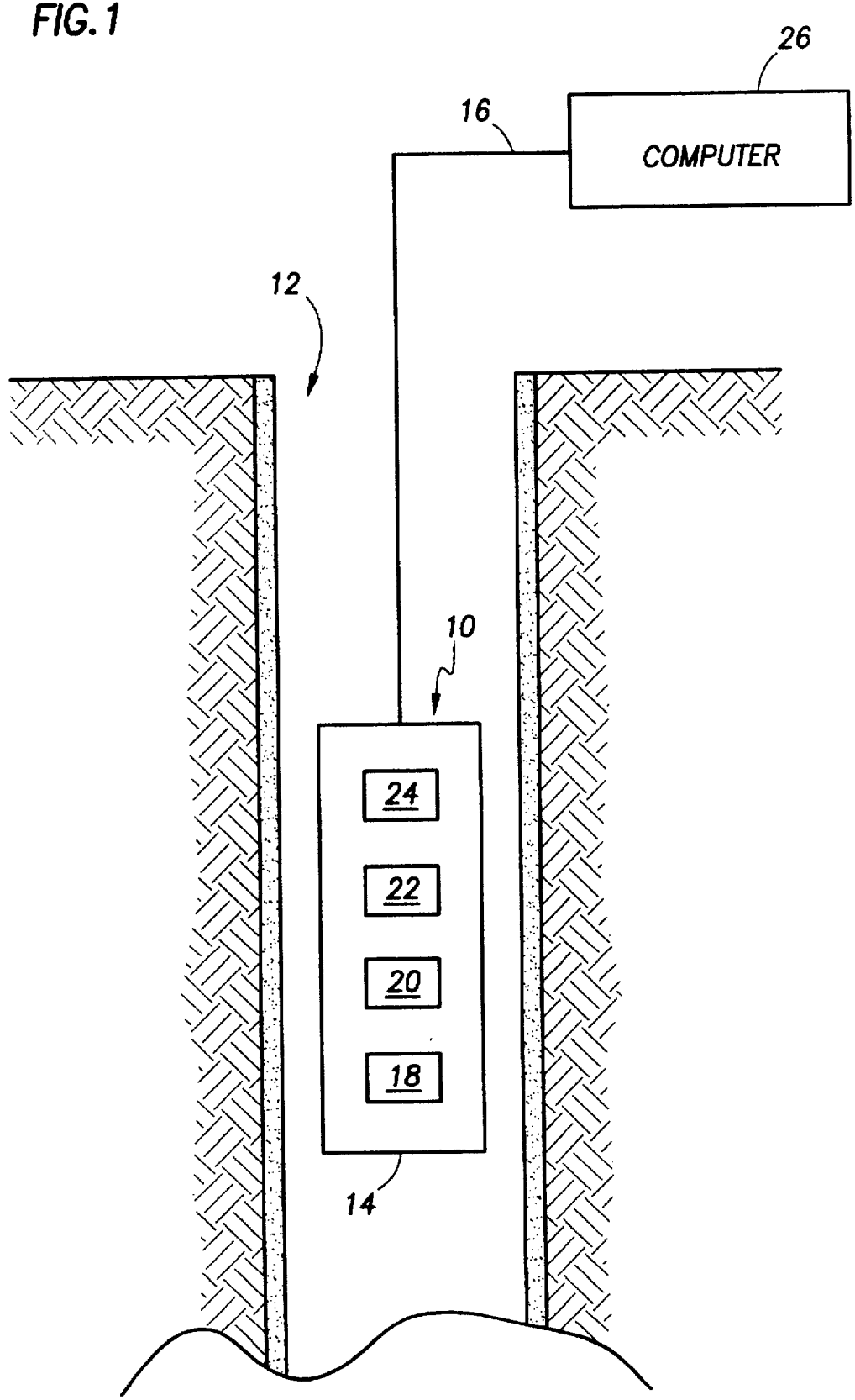
FIG. 1 is a schematic illustration of a well logging tool within a borehole.

FIG. 1 schematically illustrates logging sonde 10 in a borehole 12 during logging operations. The borehole 12 is typically lined with steel casing cemented in place to the formation and may further include production tubing. The sonde 10 comprises a pressure resistant housing 14 suspended by an armored cable 16. A winch (not shown) is located at the surface and is used to lower and raise the housing 14 in the borehole 12. An accelerator or pulsed neutron source 18 is mounted in the sonde 10 with near detector 20 and far detector 22. Signals from the detectors 20, 22 are passed to the electronics 24 for transmission to the surface. Computer 26 receives gamma ray spectral data and count rates from detectors 20, 22 and processes the information according to the method of this invention to produce a measurement representative of formation hydrocarbon saturation, $S_o$.

Figure 2:
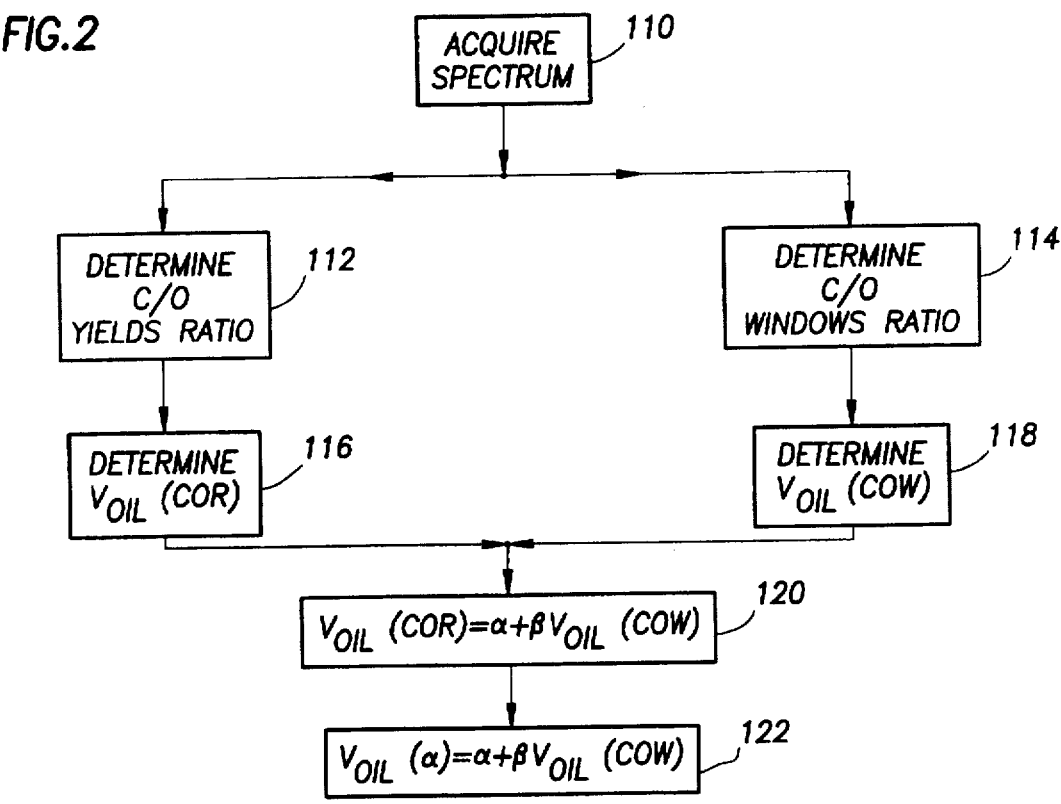
FIG. 2 illustrates a flow diagram for logging an earth formation using standard alpha processing.

FIG. 2 illustrates a flow diagram of oil saturation derived from alpha processing the inelastic energy spectra and gamma ray counts detected by the sonde 10. After acquiring the gamma ray spectrum at step 110, a carbon-oxygen yields ratio is computed at step 112 and a carbon-oxygen windows ratio is computed at step 114. The volume of oil determined from the carbon-oxygen yields ratio is calculated at step 116 and the volume of oil determined from the carbon-oxygen windows ratio is calculated at step 118. Next, at step 120, the linear correlation between the volume of oil determined at steps 116 and 118 is used to derive α according to the following equation:

$$V_{oil}(COR) = \alpha + \beta V_{oil}(COW), \quad (1)$$

where $V_{oil}(COR)$ represents the volume of oil determined from the carbon-oxygen yields ratio, β represents a calibration constant, and $V_{oil}(COW)$ represents the volume of oil determined from the carbon-oxygen windows ratio. This correlation may be the same over the entire length of the borehole. If the correlation varies, a variable length filter is used to obtain the correlation as a function of depth. Finally, at step 122 the alpha processed volume of oil is computed according to the following equation:

$$V_{oil}(\alpha) = \alpha + \beta V_{oil}(COW), \quad (2)$$

where $V_{oil}(\alpha)$ represents the alpha processed volume of oil, β represents a calibration constant, and $V_{oil}(COW)$ represents the volume of oil determined from the carbon-oxygen windows ratio.

Figure 3:
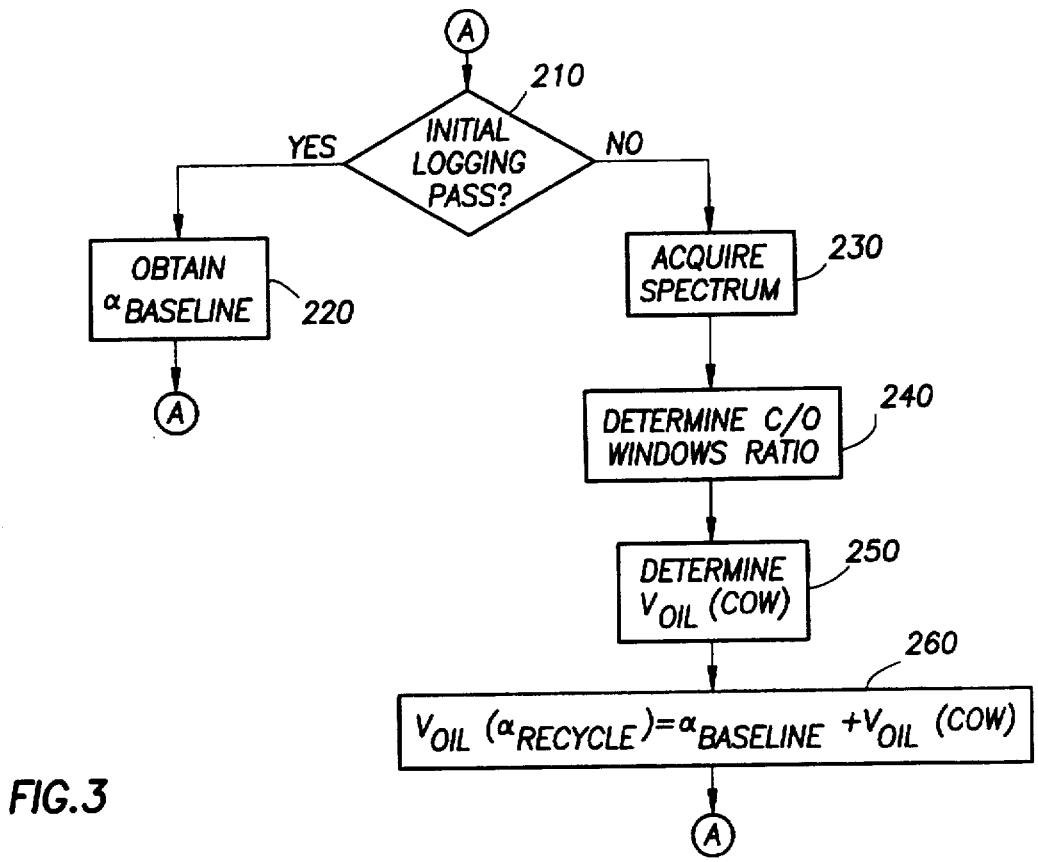
FIG. 3 illustrates a flow diagram for logging an earth formation using recycled alpha data.

Referring to FIG. 3, a flow diagram for logging an earth formation using recycled alpha data is illustrated. For an initial logging pass (step 210), an $\alpha_{baseline}$ is obtained at step 210. In a preferred embodiment of the invention, the $\alpha_{baseline}$ is derived according to steps 110, 112, 114, 116, 118, and 120. For each subsequent logging pass (step 210), a gamma ray spectrum is acquired (step 230). Next, the carbon-oxygen windows ratio is computed (step 240). At 250, the oil volume from the carbon-oxygen windows ratio is calculated. At 260, the $\alpha_{baseline}$ is added to the oil volume calculated at step 250 according to the following equation:

$$V_{oil}(\alpha_{recycle}) = \alpha_{baseline} + V_{oil}(COW), \quad (3)$$

where $V_{oil}(\alpha recycle)$ represents the recycled alpha processed volume of oil, $\alpha_{baseline}$ represents a baseline alpha obtained from an initial logging pass, and $V_{oil}(COW)$ represents the volume of oil determined from the carbon-oxygen windows ratio.

A linear constant may be added to the oil volume calculated at step 260 to compensate for variations between logging tools. Since $\alpha_{baseline}$ is a function of the borehole tubulars and independent of oil saturation, $\alpha_{baseline}$ remains constant for each subsequent logging pass. By recycling the $\alpha_{baseline}$ and omitting the steps of determining the carbon-oxygen yields ratio, determining the volume of oil from the carbon-oxygen yields ratio, and determining a linear relationship between the volume of oil from carbon-oxygen yields ratio and the volume of oil from carbon-oxygen windows ratio, the logging speed for subsequent runs is increased without diminishing the accuracy of the oil volume calculated for each subsequent run.

Figure 4:
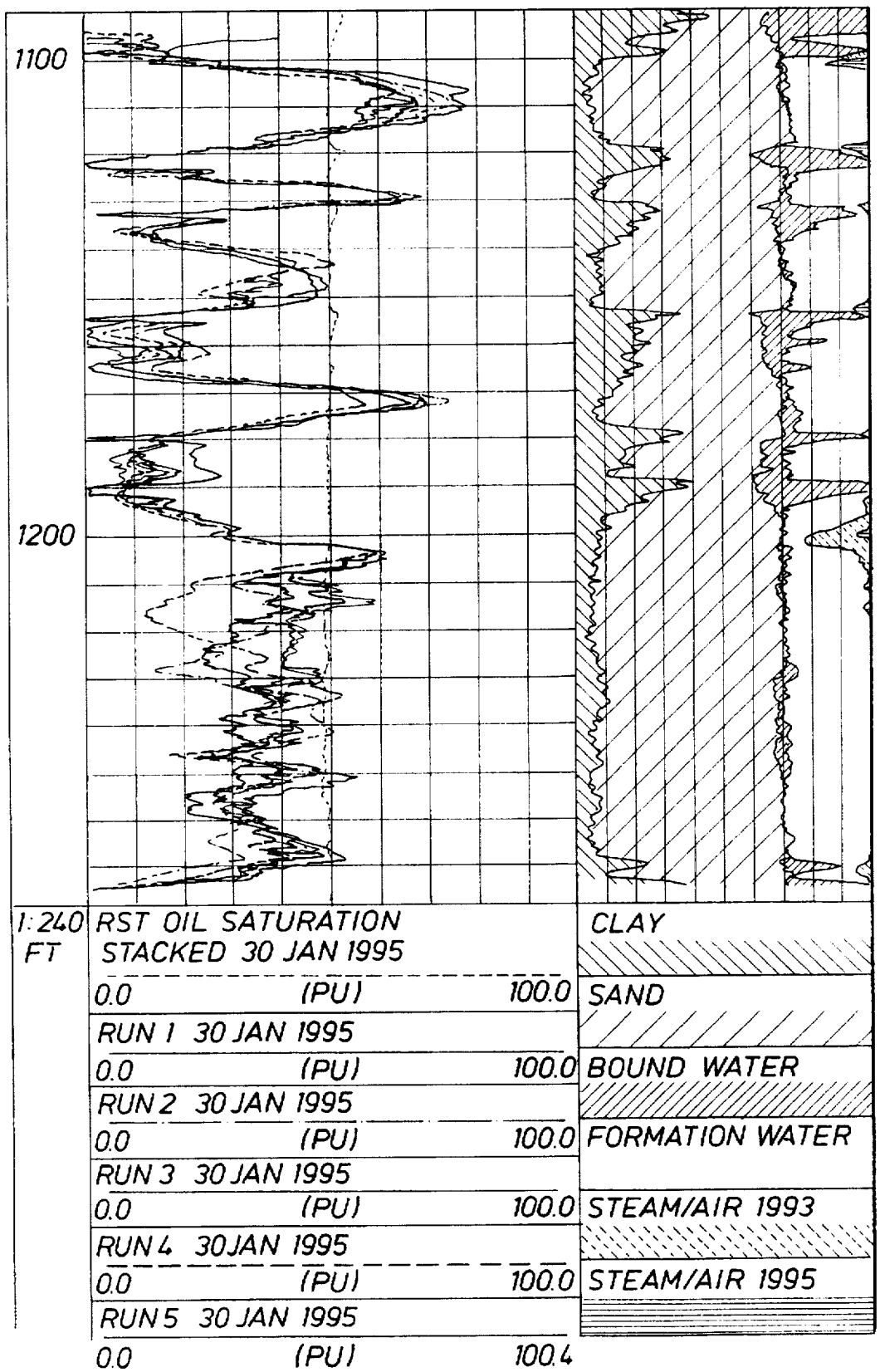
FIG. 4 illustrates an oil saturation curve using the RST and standard alpha processing; and, FIG. 5 illustrates an oil saturation curve using the RST and the method of the subject invention.
Figure 5:
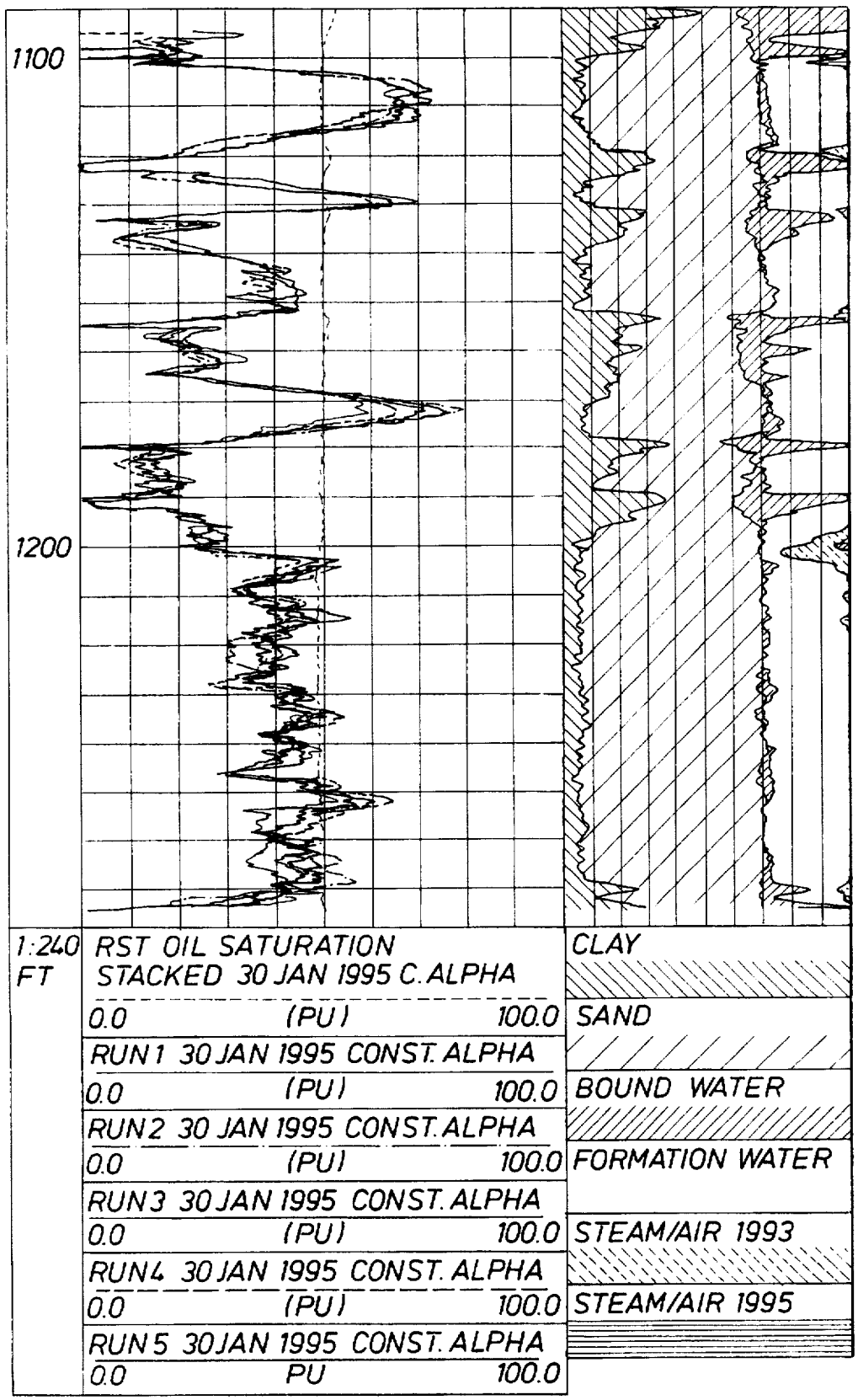

FIG. 4 illustrates an oil saturation curve for five logging passes obtained during a single time period using the RST and alpha processing. For purposes of monitoring changes in oil saturation over a predetermined period of time, these five passes would be difficult to utilize due to the imprecision of the resulting signal. FIG. 5 illustrates an oil saturation curve for five logging passes obtained during a single time period using the RST and the method of the subject invention. Recycling the $\alpha_{baseline}$ improves the precision of the measured oil volume by approximately 47.5%. The method of the subject invention also increases the logging speed by a factor of 2.18.

The foregoing description of the preferred and alternate embodiments of the present invention have been presented for purposes of illustration and description. It is not intended to be exhaustive or limit the invention to the precise form disclosed. Obviously, many modifications and variations will be apparent to those skilled in the art. As can be seen, FIG. 4 and FIG. 5 illustrates the practice of the invention with the RST. While so illustrated, it should be evident that the invention may be practiced with any logging tool that generates an inelastic gamma ray spectrum. The embodiment was chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What I claim is:

1. A method for determining a characteristic of an earth formation traversed by a borehole, comprising the steps of:
    a) passing a logging tool through the borehole, the logging tool having a neutron source and at least one detector longitudinally spaced from the source;
    b) irradiating the formation with the source of neutrons using sufficient energy to interact with atoms of the formation and the borehole;
    c) detecting the gamma rays resulting from the interaction of the atoms at at least one location longitudinally spaced from the source;
    d) forming inelastic gamma ray spectrum signals from the detected gamma rays and deriving from the signals a first attribute of the formation;
    e) generating count rate signals responsive to the detected gamma rays and deriving from the count rate signals a second attribute of the formation;
    f) determining a value for the linear correlation between the first attribute and the second attribute;
    g) irradiating the formation on a subsequent logging pass with the source of neutrons;
    h) generating gamma ray count rate signals responsive to the subsequent logging pass and deriving from the count rate signals a subsequent attribute of the formation; and,
    i) combining the linear correlation value with the subsequent attribute of the formation to derive a formation characteristic.

2. The method of claim 1 wherein the formation characteristic is oil saturation.

3. The method of claim 2, further comprising the step of compensating for variations of the logging tool.

4. The method of claim 1 wherein the first attribute is a volume of hydrocarbons.

5. The method of claim 4 wherein the second attribute is a volume of hydrocarbons.

6. The method of claim 5 wherein the subsequent attribute is a volume of hydrocarbons.

7. The method of claim 6 wherein the formation characteristic is oil saturation.

8. An apparatus for determining a characteristic of an earth formation traversed by a borehole, comprising:
    a) a logging tool having a neutron source and at least one detector longitudinally spaced from the source;
    b) means for lowering the logging tool into the borehole for an initial logging pass;
    c) means for irradiating the formation with the source of neutrons using sufficient energy to interact with atoms of the formation and the borehole;
    d) means for detecting the gamma rays resulting from the interaction of the atoms at at least one location longitudinally spaced from the source;

e) means for forming inelastic gamma ray spectrum signals from the detected gamma rays and deriving from the signals a first attribute of the formation;

f) means for generating count rate signals responsive to the detected gamma rays and deriving from the count rate signals a second attribute of the formation;

g) means for determining a value for the linear correlation between the first attribute and the second attribute;

h) means for lowering the logging tool into the borehole for a subsequent logging pass;

i) means for irradiating the formation on the subsequent logging pass with the source of neutrons;

j) means for generating gamma ray count rate signals responsive to the subsequent logging pass and deriving from the count rate signals a subsequent attribute of the formation; and, k) means for combining the linear correlation value with the subsequent attribute of the formation to derive a formation characteristic.

9. The apparatus of claim 8 wherein the formation characteristic is oil saturation.

10. The apparatus of claim 8 wherein the first attribute is a volume of hydrocarbons.

11. The apparatus of claim 10 wherein the second attribute is a volume of hydrocarbons.

12. The apparatus of claim 11 wherein the subsequent attribute is a volume of hydrocarbons.

13. The apparatus of claim 12 wherein the formation characteristic is oil saturation.

* * * * *